Feb. 22, 1955 E. BOHNET 2,702,430
ANGLE INDICATOR
Filed Oct. 20, 1953

INVENTOR.
Emil Bohnet
BY Popp and Sommer
Attorneys.

2,702,430
Patented Feb. 22, 1955

2,702,430

ANGLE INDICATOR

Emil Bohnet, Buffalo, N. Y.

Application October 20, 1953, Serial No. 387,200

2 Claims. (Cl. 33—75)

This invention relates to an angle indicator for use in laying out angles on metal parts to be machined or for measuring angles on machined parts.

The principal object of the present invention is to provide an angle indicator for the purposes mentioned which is easy to set up and operate, is adapted to be supported in many different ways so that the device can be used on various types of machine tools, and is adapted to be used for measuring angled surfaces disposed in various positions on the part to be checked.

Another object is to provide such an indicator device which is simple in construction and inexpensive to manufacture.

Other objects and advantages will be apparent from the following description and accompanying drawings wherein.

Figure 1:
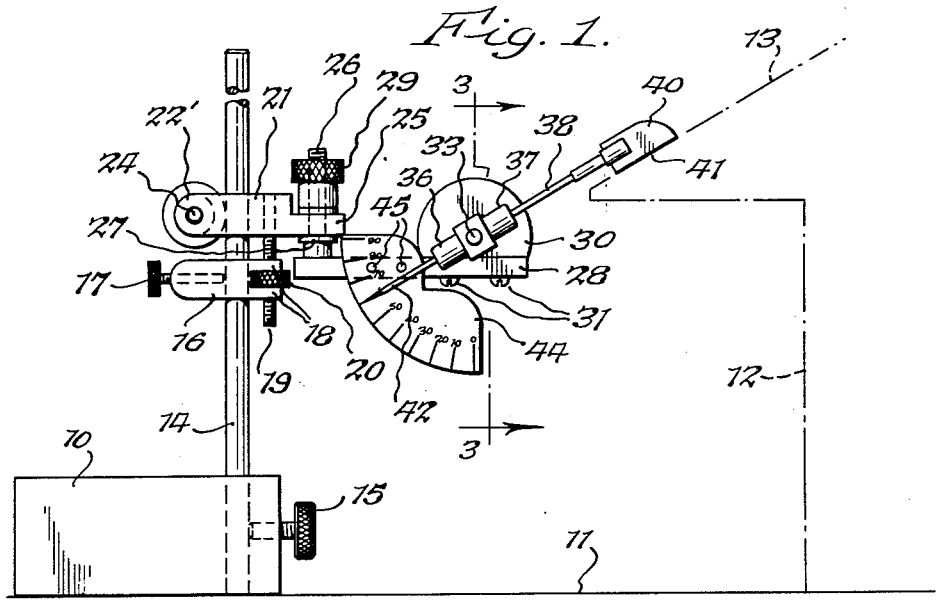
Fig. 1 is a side elevational view of an indicator device embodying my invention and showing the device supported on a reference surface for checking the angle on a part also arranged on such surface.

The indicator device proper can be mounted in any suitable way, such as on a bar which can be mounted in a tool stock on a lathe, or on a bar mounted in a planer or shaper. In the drawings, the device is illustrated as being supported on a block 10 which in turn rests on a horizontal reference surface 11 on which also rests, for illustration purposes, a machined part 12 having an inclined upper surface 13 the angularity of which is to be measured by the indicator device. To this end, the block 11 has a vertical recess in which a post 14 is arranged and held fast to the block 10 by means of a thumb screw 15. Arranged on this post 14 is a collar 16 having a vertical hole through which the post extends. One side of this collar 16 is extended and provided with a horizontal internally threaded hole which extends from the outer end face of the collar to the vertical hole provided therein. This horizontal hole receives a thumb screw 17 which when screwed inwardly has its inner end bearing against the post 14 and serves to hold the collar in the desired vertically adjusted position on the post.

The opposite side of the collar 16 is provided with a pair of vertically spaced and laterally extending arms 18 having alined vertical holes which are unthreaded but which permit an elongated vertical screw 19 to move axially thereof. Between the arms 18 is arranged a nut 20 which is preferably in the form of a disk having its outer periphery knurled for ease of manipulation and has its threaded bore working on the threads of the screw 19. The upper and lower surfaces of the nut 20 bear respectively against the opposing surfaces of the arms 18.

Figure 2:
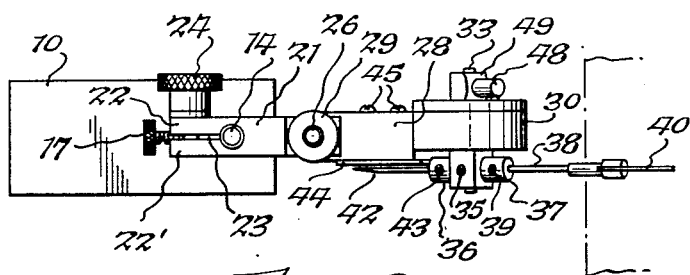
Fig. 2 is a top plan view of the device shown in Fig. 1.

The elongated vertical screw 19 is connected at its upper end to a clamp member 21. The screw 19 is fast to the member 21 so as not to rotate relative thereto. The clamp member 21 is arranged above the collar 16 and as shown in Fig. 2, has a pair of laterally extending arms 22 and 22' separated by a vertical slit 23 which extends from the outer end of these arms to a vertical hole through which the post 14 extends. The arm 22' adjacent its outer end is provided with an internally threaded hole and the arm 22 is provided with an alined but unthreaded hole. The threaded stem of a thumb screw 24 extends through the unthreaded hole in the arm 22 and screws into the internally threaded hole in the arm 22'. Thus by tightening the thumb screw 24 the arms 22 and 22' are drawn together thereby to clamp the member 21 to the post 14.

The clamp member 21 is shown as having a forwardly extending projection 25 of reduced vertical thickness and provided with a vertical hole. Arranged within this hole is a screw 26 the lower end of which is enlarged to form a collar 27 suitably rigidly connected to one end of a support arm 28. The collar 27 is adapted to be drawn up against the lower face of the projection 25 by means of a nut 29 arranged on the upper end of the screw 26 and engaging with the upper face of the projection 25. Such a mounting of the support arm 28 permits the same to be shifted in a horizontal plane to any desired angle by loosening the nut 27, shifting the support arm 28 to the desired angular position and thereafter re-tightening the nut 27.

The structure so far described permits the support arm 28 to be supported for vertical translational movement and also for pivotal movement about a vertical axis.

Figure 4:
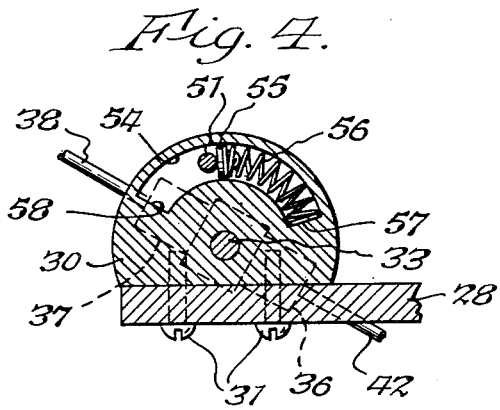
Fig. 4 is a vertical longitudinal fragmentary sectional view thereof taken on line 4—4, Fig. 3.
Figure 3:
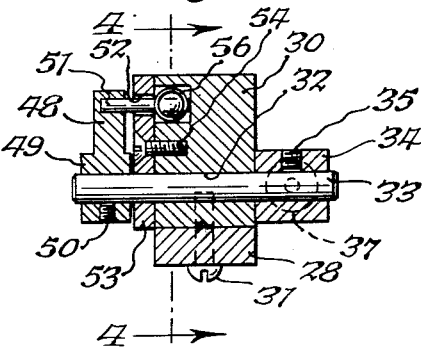
Fig. 3 is a generally vertical transverse sectional view thereof taken on line 3—3, Fig. 1.

A bearing block 30 is shown as mounted on the upper surface of the support arm 28 adjacent the latter's outer or free end. Such bearing block 30 is held to the arm by means of the screws 31, 31 which are shown as extending upwardly through holes provided in the support arm 28 and screwing into threaded recesses provided in the bearing block 30. Referring to Figs. 3 and 4, the bearing block 30 is shown as having a horizontal hole 32 extending transversely therethrough. Rotatably arranged within such hole 32 is a transverse shaft 33. The length of the shaft 33 is such that it has substantial end portions extending outwardly beyond the sides of bearing block 30. On one such outwardly extending end portion is arranged a hub 34 which is held fast to the shaft 33 in the desired angular position relative thereto by means of a set screw 35. The hub 34 is shown as formed with integral tubular extensions 36 and 37. These tubular extensions 36, 37 have their recesses in axial coincidence. Arranged within the recess of the tubular extension 37 is a rod 38 which is held fast to the extension by means of a set screw 39. The outer or free end of the rod 38 carries a blade 40 having a straight edge 41 on one side. This straight edge 41 is parallel to the axis of the rod 38. The other tubular extension 36 receives one end of a pointer 42 which is held fast to the tubular extension by means of a set screw 43. The outer or free end of the pointer 42 is pointed so that the tip of this point falls on the central longitudinal axis of the pointer 42 and the rod 38. The pointer 42 traverses a scale 44 which has arranged thereon the angle markings from 0 to 90° shown in Fig. 1, computed with respect to the axis of the shaft 33. On an actual scale there would be, of course, markings for individual angles between the 10 degree intervals shown. The angle scale 44 is in the form of a plate secured to the same side of the support arm 28 on which the pointer 42 is arranged and, as shown in Fig. 2, this plate is held by horizontal screws 45, 45 which pass through the body of the support arm 28.

For a purpose hereinafter described, it is desired to yieldingly resist rotation of the shaft 33 in a counter-clockwise direction as viewed in Fig. 1. To this end, the end of the shaft 33 opposite from that end which carries the hub 34 has fast thereto an arm 48. This arm has an enlarged hub 49 which embraces the corresponding end of the shaft 33 and is held fast thereto by a set screw 50. The arm 48 adjacent its free end carries a laterally projecting pin 51 which extends generally parallel with the shaft 33. This pin 51 projects through an arcuate slot 52 formed in a cover plate 53 which is held to the bearing block by means of one or more screws 54. Referring particularly to Fig. 4, the journal block 30 is provided with an arcuate recess 54 which opens to the corresponding side of the bearing block and is partially covered by the cover plate 53 thereby jointly forming an arcuate compartment. The pin 51 extends into the arcuate recess 54 and is constantly engaged by a follower 55 arranged at one end of a helical compression spring 56, arranged within the arcuate recess 54. The opposite end of this spring 56 bears against one end wall 57 of the recess 54. Thus the spring 56 which is always in a state of compression constantly urges the pin 51 carried by the arm 48 toward the end wall 58 of the arcuate recess 54.

Assuming that the angle of the surface 13 of the part 12 is to be measured, either with respect to the horizontal, as represented by the reference surface 11, or the vertical, the part 12 is placed on the reference surface 11. The indicator device is then moved adjacent to the part 12 and the rod 38 manually lifted, against the urging of the spring 56, and allowed to descend so that some part of the straight edge 41 rests upon the angled surface 13. Before the angled surface is measured, it is important that the straight edge 41 engage throughout its full length the flat angled surface 13. In other words, the straight edge 41 must be parallel to the surface 13. Assuming that the toe or right hand end only of the straight edge 41 engages the surface 13, it becomes necessary to lower the support arm 28 to achieve this parallelism which is determined by sight. This is done by loosening the clamping screw 24 and thereafter turning the nut 20 in the appropriate direction to cause the clamping member 21 to lower relative to the collar 16. Should sufficient clearance not be present between the clamping member 21 and the collar 16, the collar is lowered on the post 14 by loosening the thumb screw 17 and again tightening this screw after the collar has been moved to a lower position on the post. Thereafter fine adjustments in the vertical position of the support arm 28 can be achieved by turning the nut 20. Such vertical adjustment continues until the straight edge 41 is perfectly flat on the angled surface 13. It will be noted that during the vertical translational movement of the support arm 28, the spring 56 constantly urges but yieldingly so the straight edge 41 of the blade 40 against the angled flat surface 13.

Assuming, on the other hand, that when the indicator device is first brought up to the part 12 the heel or left hand end only of the blade 41 rests on the angled surface 13, this requires the support arm 28 to be moved upwardly until the straight edge 41 along its full length rests on the flat angled surface 13. This latter condition is achieved by moving the support arm 28 upwardly in a manner just in reverse of that described immediately hereinabove.

When the straight edge 41 engages the flat angled surface 13 along its full length the angle of such surface can be detected by examining the position of the pointer 42 with respect to the angle markings on the angle scale 44 thereby permitting the angle of the surface 13 relative to the horizontal or vertical to be measured.

It will also be seen that the support arm 28 can be shifted about the axis of the screw 26 to any desired angular position. Such an angular adjustment of the support arm 28 may be required because of the shape of the part having a particular angled flat surface to be measured.

Instead of the post 14 being mounted on the surface block 10, the post may be mounted on a bar of such shape that it may be mounted on a tool holder of a conventional machine tool, such as a lathe, planer or shaper, to permit an angled flat surface being formed on such machine tool to be checked from time to time.

Also, it is to be noted that the indicator device can be inverted, if desired on the post 14 so that the clamping member 21 will be below the collar 16 and, more important, the straight edge 41 on the blade 40 will be an upper surface rather than a lower surface as shown in Fig. 1.

I claim:
1. An angle indicator comprising a bearing block, a support therefor, a shaft journalled on said block, a member mounted on said shaft and projecting laterally therefrom and having adjacent its outer end a straight edge adapted to engage a flat surface the angularity of which is to be measured, a pointer fast to said shaft and projecting laterally therefrom, a scale mounted on said support and adapted to be traversed by said pointer, said scale having angle markings computed with respect to the axis of said shaft, an arm mounted on said shaft and projecting laterally therefrom, a pin on said arm adjacent its outer end, and projecting generally axially of said shaft, said bearing block having an arcuate compartment concentric with said shaft, said pin projecting into said compartment, and a helical compression spring arranged within said compartment and bearing against said pin whereby turning of said shaft in one direction is yieldingly resisted.

2. An angle indicator comprising a support arm, means connected to one end of said support arm and arranged to support the same for vertical translational movement and also pivotal movement about a vertical axis, a bearing block on the opposite end of said support arm, a horizontal shaft journalled transversely on said bearing block and extending outwardly beyond the opposite sides thereof, a pointer projecting radially outwardly from one end of said shaft, a scale having angle markings thereon computed with respect to the axis of said shaft and arranged on said support arm so as to be traversed by said pointer, a rod extending radially outwardly from said one end of said shaft, a blade on the outer end of said rod and having a straight edge arranged parallel with said pointer, and yielding means operatively associated with said shaft and arranged to resist the turning thereof and including a pin extending axially of said shaft and connected to the opposite end of said shaft and projecting toward said block, said block being provided with an arcuate compartment concentric with said shaft and receiving said pin, and a helical compression spring arranged within said compartment between one end thereof and said pin.

References Cited in the file of this patent
UNITED STATES PATENTS

| | | |
|---|---|---|
| 1,436,111 | Reich | Nov. 21, 1922 |
| 1,643,404 | Bradstreet | Sept. 27, 1927 |
| 2,481,062 | Anderson | Sept. 6, 1949 |
| 2,660,799 | Strauss | Dec. 1, 1953 |